United States Patent
Kaplan

Patent Number: 6,097,480
Date of Patent: Aug. 1, 2000

[54] VEHICLE INTERLOCK SYSTEM

[76] Inventor: Milton Kaplan, 1523 Hawks Meadow, San Antonio, Tex. 78248

[21] Appl. No.: 09/013,724

[22] Filed: Jan. 27, 1998

[51] Int. Cl.$^7$ .................................................... G01N 33/48
[52] U.S. Cl. ............................................. 356/139; 356/50
[58] Field of Search ........................................ 356/39, 50

[56] References Cited

U.S. PATENT DOCUMENTS

| | | | |
|---|---|---|---|
| 3,789,311 | 1/1974 | Masuda | 330/6 |
| 4,607,719 | 8/1986 | Rugis et al. | 180/272 |
| 4,613,845 | 9/1986 | Du Bois | 340/53 R |
| 4,738,333 | 4/1988 | Collier et al. | 180/272 |

Primary Examiner—Robert H. Kim
Assistant Examiner—Reginald A. Ratliff

[57] ABSTRACT

The invention is of a vehicle interlock system which utilizes non-invasive, optically based methods for detecting and measuring levels of certain target chemical substances in the blood or tissues of a user in preventing operation of the vehicle by persons exhibiting higher (or lower) than prescribed levels of such chemicals. The system of the present invention is not limited to simply measuring blood alcohol levels as are presently available breathalizer-based interlock systems, but lends itself to use in detecting unacceptable systemic levels of virtually any chemical for which the system if programmed to measure. In addition, the present system includes components for positively identifying, and during the course of vehicle operation, re-identifying the intended user and alcohol or drug user testee.

1 Claim, 4 Drawing Sheets

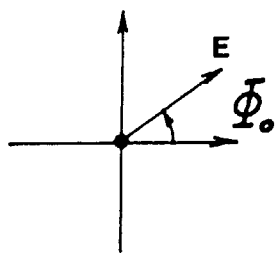
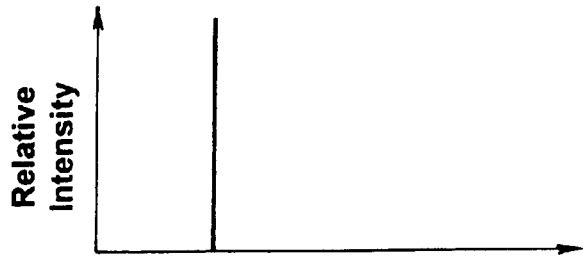
Figure 4a        Figure 4b   $\Phi_o$ Degrees
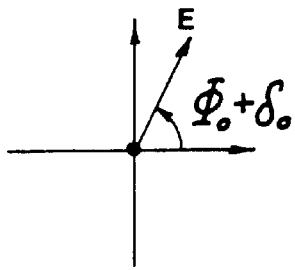
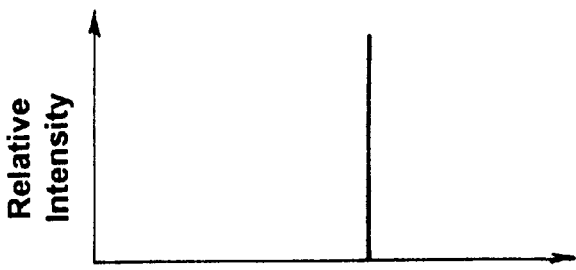
Figure 5a        Figure 5b   $\Phi_o + \delta_o$ Degrees
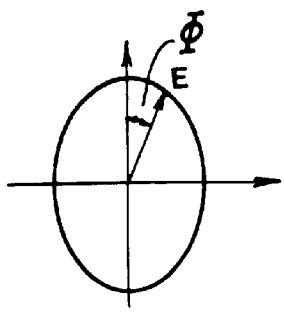
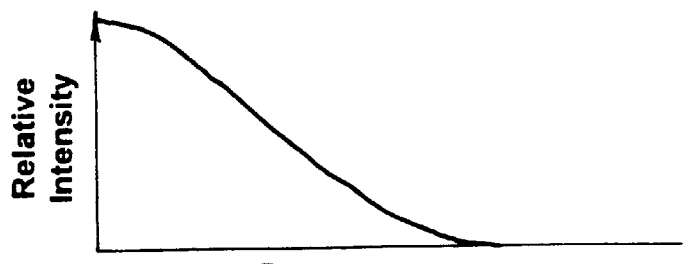
Figure 6a        Figure 6b   $\Phi$ Degrees

VEHICLE INTERLOCK SYSTEM

BACKGROUND OF THE INVENTION

1. Field of the Invention

Applicant's invention relates to selective access systems for control of the use of motor vehicles.

2. Background Information a. The Problem Presented.

Systems are known which are intended to control access to and/or operation of motor vehicles, such access or denial thereof intended to be determined by a would-be driver's alcohol level. Such systems involve the interfacing of a "breathalizer" with a vehicle's ignition system. Such an "interlock" system interrupts operation of the vehicle engine's ignition and/or starter systems if the breathalizer indicates that the user exhibits a blood alcohol level in excess of a pre-determined level. Conversely, if a lower than prescribed alcohol level is indicated, the vehicle will operate normally.

Examples of vehicle interlock systems for controlling vehicle operation by intoxicated drivers are taught in the following U.S. patents:

| U.S. Pat. No. | Inventor(s) |
|---|---|
| 3,780,311 | Brown |
| 4,738,333 | Collier |
| 4,607,719 | Rugis, et al |
| 4,613,845 | DuBois |

The presently available vehicle interlock systems have certain shortcomings which include a lack of efficacy for detecting impairments other than alcohol intoxication, including drug related impairment. Also, it is possible for an impaired driver to "trick" vehicle interlock systems by having a sober accomplis perform the breathalizer test so that the impaired driver can operate the vehicle, or to perform other physical activities which are intended to identify the suspect driver.

It would be desirable to provide a new generation of vehicle interlock systems which control access to vehicle operation, not just based on measurable blood alcohol level, but through the additional detection and quantitative measurement of non-alcoholic drug levels and even the detection of dangerous physical conditions which are detectable through analysis of blood or tissue chemistry, such as acute imbalances arising from diabetes, hypoglycemia, severe dehydration, etc. An even greater degree of societal protection would arise from such a new generation of vehicle interlock systems which positively identifies drivers and repeatedly re-tests and re-verifies identity during the course of vehicle operation.

b. Basic Concept of Interlock System.

The vehicle interlock of the present invention incorporates, in lieu of existing breathalizer user testing components of vehicle interlock systems, an optically based user testing system which non-invasively analyzes blood and tissue with respect to the presence and concentration of certain chemical constituents. A preferred embodiment of the present system will involve a device into which a monitored driver will insert a finger, ear lobe, or other bodily projection for analysis of systemic alcohol or drug concentrations.

c. Optical Analysis Aspects of System.

All wavelength components of polychromatic light are polarized, but not in the same way, and each must be examined separately. Each wavelength responds differently to a specific optically active medium.

After adding the analysis of wavelength it is advantageous to add the more complex analysis of the polarization rotational characteristics that result from the irradiation of complex solutions (such as blood). In general, organic molecules are structured in spiraled form and have a definite helicity or handedness. It is this helicity which gives a molecule its ability to rotate the polarization of the incident light. For example, dextrose (d-glucose) is, by convention, right-handed since, when viewed from the perspective of light emerging from the sample, the polarization axis has rotated in a clockwise direction. On the other hand, levulose (fruit sugar) is left-handed since it rotates the polarization axis in a counter clockwise direction. Molecules or material which exhibit this kind of optical activity are said to possess optical rotary power. In particular, these are termed dextrorotary or levorotatory respectively depending upon the action on the polarization of the incident light. The magnitude of the angle, through which the polarization direction rotates is, in simple theory, proportional to the inverse of the wavelength of the incident light squared. Sometimes called a dispersion function, this relationship has a weak dependence on wavelength but is strongly a function of the type of material or molecular structure being irradiated. This functional dependence on the physical properties of the medium manifests itself in the difference of the indices of refraction for right- and left-handed polarized light. Two circularly polarized waves of opposite helicity form a set of basic fields for the description of any general state of polarization. As a result, for example, if the polarization of the light irradiating the sample were purely elliptical not only would the ellipse rotate by about an axis parallel to the direction of propagation of the light, but the ellipse also distorts—its eccentricity changes. This latter phenomenon is called circular dichroism. It is due to the different absorption between right- and left-handed circularly polarized light.

In a fluid, where there is no long-range order, the molecules are randomly oriented. Nevertheless, the effect of rotary power is not averaged out to zero. Since the constituent molecules all have a definite helicity which is the same, they cannot be brought into coincidence with their mirror images—they are enantiomorhpous. Thus, the effect of the rotary power of an individual molecule is enhanced in a fluid state. Substances which exhibit both optical rotary power and circular dichroism are referred to as chiral media.

A glucose solution is an isotropic chiral substance. When plane-polarized light impinges normally on glucose the vibration ellipse of the transmitted light is different from the vibration ellipse of the incident light. The difference is characterized by two quantities: (i) Optical rotation (OR), which is the angle by which the transmission ellipse rotates with respect to the incidence ellipse; (ii) Circular dichroism (CD), which is a measure of the difference in the eccentricities of the two ellipses. Profiles of the OR and the CD of an isotropic chiral substance with respect to frequency are sufficiently unique that they can be used as a component in the signature of a substance to be identified and quantified. Because the OR and the CD of any substance have been shown to be Kramers-Kronig-consistent, complete knowledge of either of the two quantities as a function of the frequency is sufficient to determine the other; therefore, the more easily measured OR is often used to characterize isotropic chiral substances.

A first issue that must be addressed is that of polarization of the light incident on the biological sample whose glucose content has to be monitored. Let us suppose that the incident light is a planewave traveling in the +z direction (of a Cartesian coordinate system) at a frequency $f$. The electric field phasor associated with this planewave may be adequately set up as $$E_{inc}(z,t) = [A_x u_x + A_y u_y] e^{-i2\pi f(t-z/c_o)}, \quad (1)$$

where t is time and $c_o = 3 \times 10^8$ m/s is the speed of light in free space; $i = \sqrt{-1}$; $(u_x, u_y, u_z)$ are the unit cartesian vectors; and $A_x$ and $A_y$ are complex amplitudes with units of V/m.

Let the complex amplitudes be independent of time t. In general, Eq. (1) then represents an elliptically polarized planewave whose vibration ellipse does not change with time t. When either $A_x=0$ or $A_y=0$, the planewave is said to be linearly polarized. When $A_x = \pm i A_y$, the planewave is circularly polarized.

Suppose now that $A_x$ and $A_y$ are functions of time t. Then Eq. (1) should be rewritten as $$E_{inc}(z,t) = [A_x(t) u_x + A_y(t) u_y] e^{-i2\pi f(t-z/c_o)}. \quad (2)$$

It still denotes a planewave, but one whose vibration ellipse changes with time t. Complicated sources have to be utilized in order to deliver specific $A_x(t)$ and $A_y(t)$ Indeed, the prior art devices utilize a complicated light source that yields $A_x(t)$ and $A_y(t)$ as controllable functions of time t.

The preferred embodiment of the present invention, however, utilizes a source based on Quartz-Tungsten-Halogen (QTH) lamp whose output in the focal region is partially polarized. Other suitable light sources include devices which emit light at multiple frequencies, such as LEDs. To understand the term "partially polarized", it is best to begin by thinking about "totally unpolarized" planewaves. The functions $A_x(t)$ and $A_y(t)$ are continuously random functions of time for a totally unpolarized planewave, therefore the rotation of a totally unpolarized planewave by a glucose cell cannot be measured and even the concept is of no meaning.

A partially polarized planewave can be thought of as a combination of a totally unpolarized planewave and an elliptically polarized planewave. The second component of the partially polarized wave suffers a definite rotation on passage through a glucose cell, therefore can be used for OR measurements.

The present invention has a source that delivers a slightly polarized planewave, thus its rotation by the glucose cell is meaningful.

A second issue that must be addressed is that of chromaticity. The devices described in the prior art ideally need monochromatic sources, i.e., sources whose outputs are fixed at precisely one frequency. Practical monochromatic sources cannot be ideal, instead their frequency range is very small.

Suppose $f_c$ is the center-frequency of a source and its 3-db bandwidth is denoted by $\Delta f$; then, we can define a quality factor $$Q = f_c / \Delta f. \quad (3)$$

The QTH lamp used in the preferred embodiment of the present invention is a white-light lamp operating from 400 to 2000 nm with a peak at 900 nm; thus, its useful frequency spectrum ranges from $1.5 \times 10^{14}$ Hz to $7.5 \times 10^{14}$ Hz with its peak intensity at $3.3 \times 10^{14}$ Hz. As the QTH output is roughly independent of the frequency over the operating range, we can estimate its $Q = 3.3/(7.5-1.5) = 0.55$. Thus, the QTH lamp is definitely a polychromatic source.

The present invention also utilizes a polarization-preserving analyzer whose response is flat over the $2.3 \times 10^{14}$ Hz to $4.3 \times 10^{14}$ Hz range, and it uses a compensated polychromatic detector to measure the intensity of the beam transmitted by the analyzer. In sum, the present invention is polychromatic (low-Q), while the devices described in the prior art are monochromatic (high-Q).

Polychromaticity has a definite advantage over monochromaticity for such things as blood glucose measurements. The OR spectrum of a chiral solute in a non-chiral solvent depends on the concentration of the solute. The amount of analyte (alcohol, drug, etc.) in the blood varies with time and from sample to sample. This means that the OR spectrum of a blood sample will shift with time as alcohol, drug, glucose, or other substances vary in concentration over time. A polychromatic system therefore has a much better chance of monitoring a continuously varying non-normoglycemic sample than a monochromatic one.

Accordingly, the user testing component of the present vehicle interlock system utilizes, not just any optical analysis methodology, but one which utilizes the unique and refined approach to optical analysis described above and distinguished from earlier approaches.

SUMMARY OF THE INVENTION

It is an object of the present invention to provide an improved vehicle interlock system, the operator testing portion of which can detect and measure blood and tissue levels of a plurality of chemicals, rather than simply alcohol.

It is an object of the present invention to provide a novel vehicle interlock system which, as a condition for operation of a motor vehicle, ascertains levels of a plurality of mood altering chemicals in the blood and tissues of users to be within prescribed limits.

It is another object of the present invention to provide a novel vehicle interlock system which replaces breathalizer technology with non-invasive, optical tissue analysis as the means by which a user's chemical impairment is detected and measured.

It is another object of the present invention to provide a system which integrates non-invasive polychromatic polarimetry analysis of a user's blood and tissues with a vehicle starter or ignition interrupt system for controlling operation of a vehicle by persons impaired by foreign substances in the blood or tissues.

It is another object of the present invention to provide a system which integrates non-invasive polychromatic polarimetry analysis of a user's blood and tissues with a vehicle starter or ignition interrupt system for controlling operation of a vehicle by persons impaired by foreign substances in the blood or tissues, but which also includes positive identification components for restricting operation of the vehicle by other the intended driver, and then, only after a suitable analysis by the interlock system.

In satisfaction of these and related objectives, Applicant's present invention provides a vehicle interlock system which utilizes non-invasive, optically based methods for detecting and measuring levels of certain target chemical substances in the blood or tissues of a user in preventing operation of the vehicle by persons exhibiting higher (or lower) than prescribed levels of such chemicals. The system of the present invention is not limited to simply measuring blood alcohol levels as are presently available breathalizer-based interlock systems, but lends itself to use in detecting unacceptable systemic levels of virtually any chemical for which the system if programmed to measure.

In addition, the present system includes components for positively identifying, and during the course of vehicle operation, re-identifying the intended user and alcohol or drug user testee.

The present invention provides judges, health care professionals, and even end-users themselves with a new tool in protecting society from chemically impaired drivers, and chemically impaired drivers from themselves. The driver who is under the influence of cocaine, heroin, marijuana, barbiturates, amphetamines, and so on, is proportionately just as dangerous to others on the road as is an alcohol impaired driver, yet present vehicle interlock systems do nothing to prevent other than alcohol abusers from using their vehicles.

BRIEF DESCRIPTION OF THE DRAWINGS

Applicant's invention may be further understood from a description of the accompanying drawings wherein, unless otherwise specified, like reference numbers are intended to depict like components in the various views.

FIGS. 4a–b and 5a–b are graphic representations of the rotation of plane polarized light.

FIGS. 6a–b and 7a–b are graphic representations of circular dichroism of pure elliptically polarized light.

DETAILED DESCRIPTION OF THE PREFERRED EMBODIMENT

One should recognize that the figures and descriptions of the present interlock system are essentially schematic in nature, and the specific methodology for optical analysis depicted herein is merely expemplary. The present invention encompasses alternative means for optically-based, non-invasive alcohol and drug content analysis in the context of vehicle interlock systems. Furthermore, whether a system of the basic nature depicted below is used, or some other optical analysis technology, in actual application, the user testing unit of the present interlock system will be miniaturized for providing a marketable product.

Figure 1:
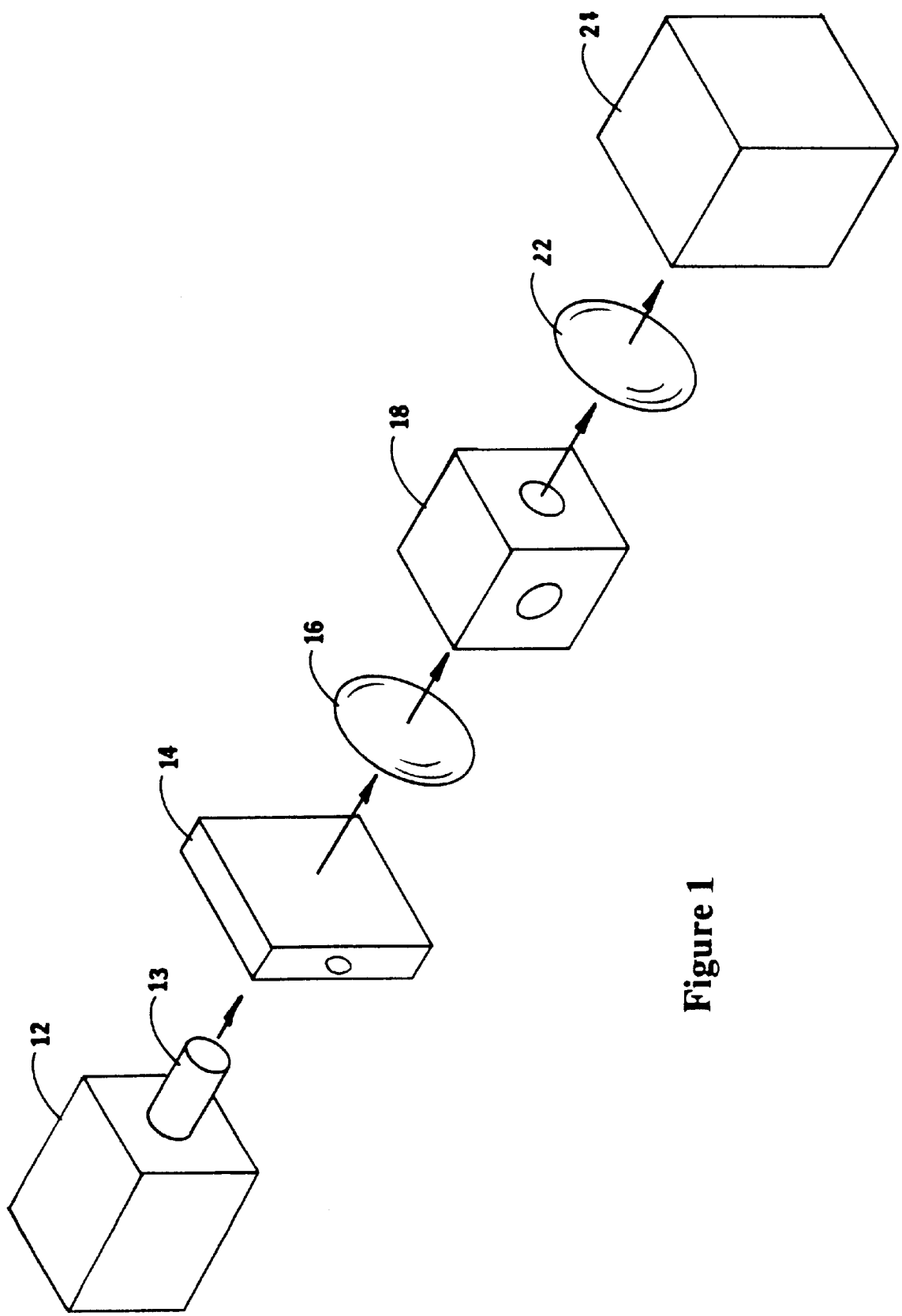
FIG. 1 is a perspective view of a preferred component composition of the optical path of Applicant's invention.

Referring to FIG. 1, the user testing unit which is the direct link between the interlock system of the present invention and a would-be operator of a vehicle incorporates an optical path (10). The preferred embodiment of Applicant's invention will involve the components of optical path (10) being incorporated into a small, hand-held unit (not shown in the drawings). Optical path (10) includes a light source (12). The light source (12) in the preferred embodiment of Applicant's invention is a tungsten halogen lamp, but the light source (12) may be any suitably energized radiation source that creates appropriate partially polarized polychromatic radiation.

The desired peak radiance of the light source in the preferred embodiment may vary, depending on the systemic substance(s) (alcohol, drugs of abuse, etc.) for which the system is designed to screen. By way of example only, when directed towards the detection and measurement of glucose levels in blood, the optimal peak radian is at approximately 900 nm. The spectral range of primary relevance for the glucose measurements is 800 nm–2000 nm. The emitted light of the tungsten halogen lamp light source is partially polarized, but with a dominant elliptical character due to its internal elliptically contoured reflecting mirror. In addition, randomly or partially polarized radiation, limited to specific range(s) of wavelengths, can be utilized through use of a light source, such as a laser source, or by the use of a monochrometer. Such a modification would be advantageous in particular applications, when a narrow frequency band of light is desired (most likely because of the particular light transmission properties of the analyzed specimens).

For certain analytical purposes involving measurement of certain constituents, an optional element in the second position can be an optical filter housing (13). For use with the preferred embodiment, laser line filters are employed—separately—with spectral transmissions at 850 n.; 905 nm; and 1064 nm. This may provide supplemental information of possible interest in developing signatures for individual constituent elements.

The next item in the optical path (10) is a test specimen (14). The ideal "test specimen" (14) for a vehicle interlock system would be would-be driver's finger, although ear lobes, finger webs, etc. might be used as well. A preferred embodiment of the present invention utilizes a rectangular finger mount which should be highly reflective to background radiation and source generated noise. A circular aperture of diameter 6.50 mm through the full width of the mount is centered on the rectangular faces allowing for the entrance and exit of light. A cylindrical finger port perpendicular to and intersecting the aperture is positioned on one side of the mount. The design of the mount should be such that there will be a constant optical path length per individual for various measurements.

The constituent compounds of the test specimen (14) will naturally polarize and rotate the polarization of the beam of light passing therethrough, thereby causing the intensity value of light exiting from the test specimen (14) in a first plane of polarization to differ from the intensity value of light exiting from the test specimen (14) in a second plane of polarization and will effect a circular dichroism for the partially polarized light as described in FIGS. 6a–b, 7a–b, 8a–b, and 9a–b. Conversely, in the absence of a test specimen (14), the intensity value of light at a specific wavelength in each plane of polarization would be substantially identical and no circular dichroism would be seen.

The next component of the optical path in Applicant's preferred embodiment is a convex BK-7 lens (16), or a functionally equivalent component in a miniaturized path (10). Lens (16) merely serves to focus the light originating from the light source (12) and transmitted through the test specimen (14) onto an adjustable polarizer or analyzer (18). Analyzer (18) polarizes the light as is transmitted through the test specimen (14) and emits the light along one or more specified polarization planes (20). The preferred embodiment of Applicant's invention will include the functional equivalent of a Glan Thompson polarizer as analyzer (18), because such a polarizer absorbs or reflects a relatively small portion of the light passing through it and can be easily adjusted between zero and 360 degrees of rotation to coincide with any polarization plane of light as exits the test specimen (14).

An acceptable substitute for a mechanical analyzer (18), such as the Glan Thompson polarizer would be an electromagnetic field capable of effecting polarization of the light as it exits the specimen (14), polarizing maintaining fiber optic or Glan Thompson analyzer.

A second convex BK-7 lens (22), or its functional equivalent, is placed after the analyzer (18) to focus the light exiting the analyzer (18) onto a detector panel (24). In a non-miniaturized embodiment of a light path according to the present invention, an ORIEL silicon detector (available from ORIEL Corp.; 250 Long Beach Blvd; Stratford, Conn. 06497) proved to be an acceptable analyzer.

The detector (24) of light path (10) will, in practicing the present invention, be linked to an analyzer (not shown in the drawings), which measures and analyzes the intensity of the polarized light at multiple wavelengths. The analyzer incorporates pattern recognition capabilities to recognize patters of light transmission characteristics which evidence certain levels (or higher) or substances to be tested (again, alcohol, certain drugs, etc. are the most likely candidates)

When the light source (12) is activated, the light travels the optical path (10) and the intensity value of the light in a first plane of polarization is detected by the detector (24) and is measured at multiple wavelengths by the analyzer. After this first measurement, the analyzer (18) is rotated to change the plane of polarization of the light emitted from the analyzer (18) to a second polarization plane and the intensity value of the light in this second polarization plane is measured at multiple wavelengths. This process of rotating the analyzer (18) to distinguish and measure the intensity of light in each of several polarization planes, at one or more wavelengths, is continued until sufficient intensity values have been measured and plotted so as to establish a pattern of such intensities and of the circular dichroism relative to the particular specimen (14) under analysis. Such a pattern can be compared against known "signature curves" of polarization transmittance of known substances at known concentrations to make possible the identification of substance(s) in the test specimen (14) (the driver's finger).

Figure 9A:
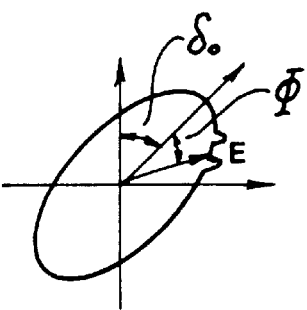
Figure 9B:
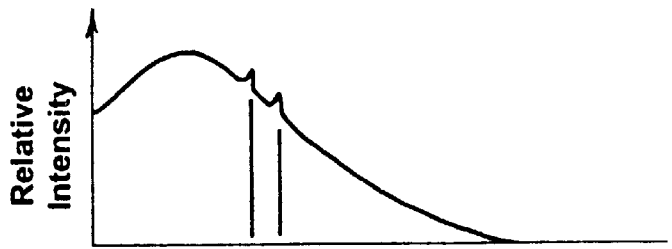

Previous optically based measurement systems have relied only upon linearly polarized monochromatic light. Such light yields a single rotational angle, and does not indicate the quantitative presence of a particular substance or molecule in the host material or solution. The apparatus of the present invention approaches the problem with partially polarized polychromatic light—chromatic polarization. Each wavelength possesses a dominant polarization character; in general, elliptical. However, due to the nature of the partially polarized light, the envelope of the dominant polarization is inscribed with a series of spike-like peaks (See FIGS. 8a–b and 9a–b). If the intensity of this light is plotted as a function of the polarization angle, there would be a maximum primary peak, plus a series of secondary peaks displaced at various angles relative to the primary peak. These secondary peaks act as markers increasing the sensitivity of the apparatus of the present invention. When the light is transmitted through a chiral medium, the primary peak shifts by an angular displacement (FIGS. 9a–b). However, each secondary peak possesses its own rotational dynamic, and relative to the primary peak the secondary peaks are now displaced at different angles than before the light entered the chiral medium. FIGS. 4a–b/5a–b, 6a–b/7a–b, and 8a–b/9a–b illustrate in a step-by-step fashion the effects of optical rotary power, circular dichroism, and partial polarization. The subscript naught on the angles in these figures indicates they are fixed. The circular dichroism distorts the shape of the ellipse and thus changes the eccentricity.

Figure 2:
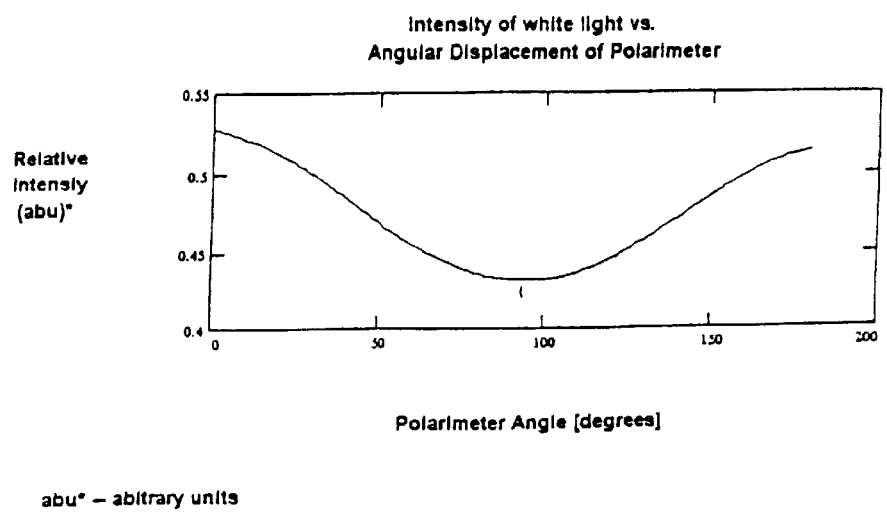
FIG. 2 is a graphic depiction of white light transmission intensity along a continuum of angularly distinguished polarization planes.

FIG. 2 graphically illustrates the distribution of light intensity values (y-axis) of specimen-transmitted white light along a continuum of angularly distinguished polarization planes (x-axis). Such plotting of the polarization plane-specific transmission intensity values at each of a plurality of polarization planes will yield a graphic pattern which is unique for that compound. As demonstrated by FIG. 2, as the planes of polarization at which the light intensity value is measured increase in number, and are plotted, a pattern will emerge, one which can be compared with known patterns for identification purposes.

Figure 3:
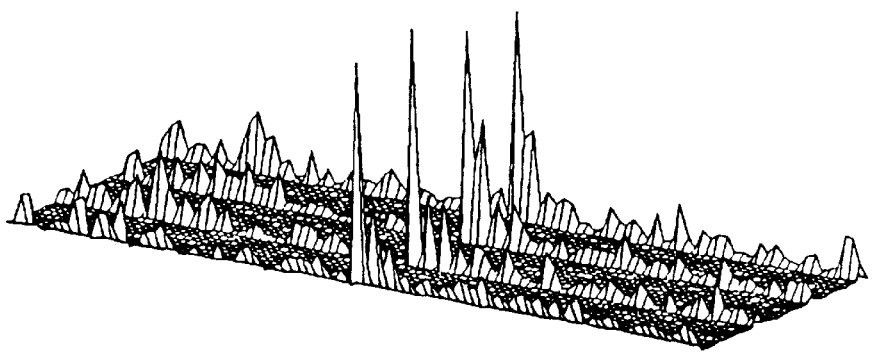
FIG. 3 is a graphic depiction of Fourier-sine transform data of a 10 mg/100 ml solution of dextrose, U.S.P. taken at four distinct wavelengths at 850, 880, 905 and 1065 nanometers.
Figure 7A:
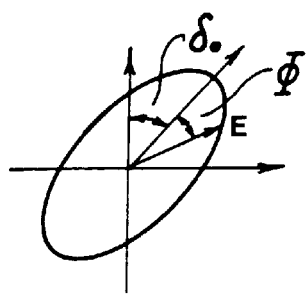
Figure 7B:
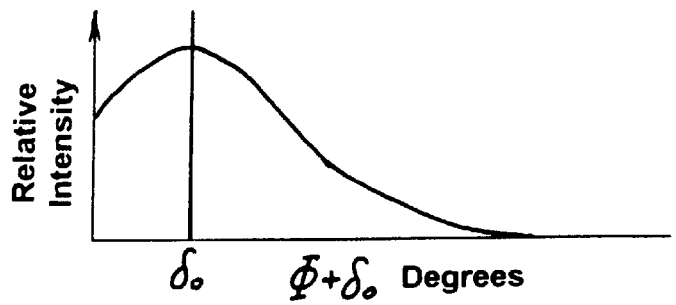
Figure 8A:
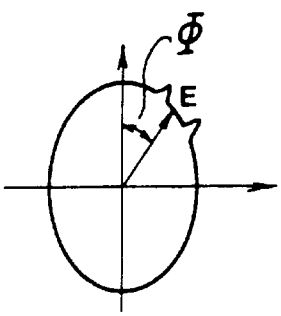
FIGS. 8a–b and 9a–b are graphic representations of circular dichroism of partially polarized light.
Figure 8B:
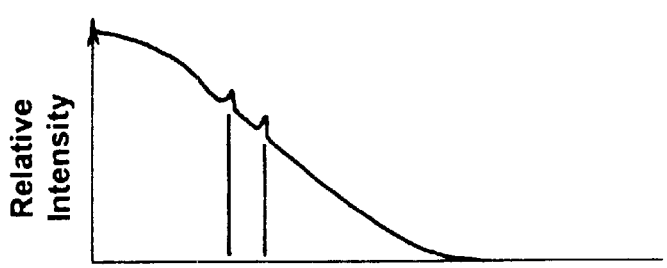

In addition, as demonstrated by FIG. 3, a different, more detailed pattern is shown in the distribution of light intensity values (y-axis) along a continuum of angularly distinguished polarization planes (x-axis) relative to wavelength-specific bands of light.

Similar patterns based upon the circular dichroism effect of various compounds can be accumulated as shown in FIGS. 6b, 7b, 8b, and 9b. Combining all of these various effects creates a more complex signature but results in a more accurate identification and quantification because more signature data provides a greater ability to distinguish minor variations in the composition of the test specimen.

Use of any or all of these patterns allows identification of a compound in even a complex sample containing multiple compounds. This is true even though certain compounds may exhibit similar polarization patterns at specific wavelengths of light, because no two compounds will exhibit identical transmission patterns at all wavelengths and in all polarization planes, nor do they exhibit the same circular dichroism. Accordingly, even though one component in a sample may "mask" the distribution or characteristics of another component at one or more specific wavelengths, and/or in a few specific polarization planes, there is little chance that this masking effect will effectively skew an analysis involving numerous polarization planes at several specific band widths of light.

It is important to further note that although the gross intensity of light passing through a specimen may vary depending on density of the specimen (differing finger sizes, for example) or the concentration of the compound in the test specimen (differing alcohol or drug levels), the proportional relative values of light transmission intensity at each of numerous polarization planes will remain substantially constant for any given compound. In other words, each birefringent compound yields a "signature curve" of light intensity values at varying polarization planes which curve shifts in toto relative to the y-axis (non-relative, gross light intensity) depending on concentration or density of the sample. This shift of the "signature curve" can, in fact, be used to derive the concentration of a constituent compound once standards for measured compounds are known.

Just as breathalizer units are interfaced with ignition and starter control systems in vehicle interlock systems of the prior art according to known methods, analyzer (18) of the present system will likewise be interfaced and will control operation of the vehicle into which the system is incorporated. A would-be driver assessed by the interlock system to have an unacceptable blood alcohol, or drug level in the blood stream or tissues will be denied operation of the vehicle.

An additional feature of the present invention is the inclusion of an identification module for the interlock system (not separately depicted in the drawings). The identification module is intended to supplement the drug and alcohol analyzing components of the present interlock system, and insure, not merely that someone has passed a sobriety test before the vehicle will operate, but that the suspect driver both initiates the procedure and remains the individual who is in and operating the vehicle.

The identification module can be based on a number of different identification technologies. Examples of identification systems which can readily be incorporated into an interlock system of the present invention are illustrated in the following U.S. patents:

| U.S. Pat. No. | Inventor(s) |
|---|---|
| 4,993,068 | Piosenka |
| 5,499,318 | Dieter, et al |
| 5,680,460 | Tomko, et al |

While the prior discussions have focused primarily upon the detection of substance abuse, and preventing operation of vehicles while under the influence of drugs or alcohol, the present system may also be used to detect other conditions which would render a driver unsafe. These conditions include analyte imbalances occasioned by diabetic events, prescription medication over-doses, severe dehydration, and any number of other conditions which could be detected by programming the analyzer portion of the present interlock system to detect concentrations of analytes in the blood and tissues at other than prescribed levels.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications as fall within the scope of the invention.

I claim:

1. An interlock system for controlling operational access to a vehicle comprising:

non-invasive optical analysis means for non-invasively analyzing analytes in blood and tissue fluids of a would-be operator of said vehicle;

identification means for comparing physical features of said would-be operator with stored parameters of an intended operator of said vehicle, for comparing said parameters with said physical features, and establishing or refuting common identity of said would-be operator and said intended operator;

said non-invasive optical analysis means and said identification means being operably interfaced with the ignition system of said vehicle whereby said ignition system is disabled until said non-invasive optical analysis means actuates first switching means integrated into said ignition system upon registering concentrations of said analytes at or below a predetermined level in said blood or tissue fluids of said would-be operator, and until said identification means actuates second switching means upon establishing said common identity.

* * * * *